(12) United States Patent
Guldenfels (10) Patent No.: US 6,793,069 B2
(45) Date of Patent: Sep. 21, 2004

(54) RADIUS CONVEYOR BELT

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/428,858

(22) Filed: May 5, 2003

(65) Prior Publication Data

US 2004/0045795 A1 Mar. 11, 2004

Related U.S. Application Data (63) Continuation of application No. 10/282,068, filed on Oct. 29, 2002, now abandoned, which is a continuation of application No. 09/874,589, filed on Jun. 5, 2001, now Pat. No. 6,523,680, which is a continuation-in-part of application No. 09/579,090, filed on May 25, 2000, now Pat. No. 6,330,941.

(51) Int. Cl.$^7$ .............................................. B65G 17/06

(52) U.S. Cl. ....................................................... 198/853

(58) Field of Search ................................ 198/850, 851, 198/852, 831

(56) References Cited

U.S. PATENT DOCUMENTS

| | | |
|---|---|---|
| 1,804,701 A | 5/1931 | Mojonnier |
| 1,937,304 A | 11/1933 | Worrall |
| 2,693,268 A | 11/1954 | Ball |
| 3,602,364 A | 8/1971 | Magllo et al. |
| 3,768,631 A | 10/1973 | Wahren |
| 3,870,141 A | 3/1975 | Lapeyre et al. |
| 4,109,784 A | 8/1978 | Hartmann |
| 4,213,527 A | 7/1980 | Lapeyre et al. |
| 4,394,901 A | 7/1983 | Roinestad |
| D270,202 S | 8/1983 | Hodlewsky et al. |
| 4,556,142 A | 12/1985 | Lapeyre |
| 4,557,374 A | 12/1985 | Bode |
| D282,907 S | 3/1986 | Schroeder et al. |
| D286,136 S | 10/1986 | Schroeder et al. |
| D288,255 S | 2/1987 | Bode et al. |
| D290,932 S | 7/1987 | Abbestam et al. |
| 4,688,670 A | 8/1987 | Lapeyre |
| D291,777 S | 9/1987 | Labeyre et al. |

(List continued on next page.)

FOREIGN PATENT DOCUMENTS

| | | |
|---|---|---|
| EP | 0521506 | 1/1993 |
| EP | 0567337 | 10/1993 |
| EP | 0 663 354 A1 | 7/1995 |
| EP | 0739830 | 10/1996 |
| FR | 2 775 965 | 9/1999 |
| GB | 2 312 196 | 10/1997 |
| JP | 07061550 | 3/1995 |
| WO | WO 93/14010 | 7/1993 |
| WO | WO 95/05986 | 3/1995 |
| WO | WO 99/50160 | 10/1999 |

OTHER PUBLICATIONS

505–Series Flexbelts.
MatTop Chains 6938.
Konstruktieleer Deel B; Konstrueren in Kunststoffen io37b (650) 1992.

*Primary Examiner*—James R. Bidwell
(74) *Attorney, Agent, or Firm*—McKenna Long & Aldridge (57) ABSTRACT

A modular conveyor belt formed of rows of belt modules pivotally interlinked by transverse pivot rods and specially adapted for following a curved conveyor path. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligner to accommodate a pivot rod. When the link ends of the consecutive rows of side by side modules are intercalated, the pivot rod serves as a hinge pin in a hinged joint between consecutive interlinked rows. To permit the belt to flex sidewise, the openings in the first link ends are slotted longitudinally in the direction of belt travel.

14 Claims, 8 Drawing Sheets

U.S. PATENT DOCUMENTS

| | | |
|---|---|---|
| 4,729,469 A | 3/1988 | Lapeyre et al. |
| 4,742,907 A | 5/1988 | Palmaer |
| 4,754,872 A | 7/1988 | Damkjaer |
| 4,821,872 A | 4/1989 | Lapeyre |
| 4,832,183 A | 5/1989 | Lapeyre |
| 4,858,753 A | 8/1989 | Hodlewsky |
| 4,893,709 A | 1/1990 | Schroeder et al. |
| 4,893,710 A | 1/1990 | Bailey et al. |
| 4,901,844 A | 2/1990 | Palmaer et al. |
| D307,707 S | 5/1990 | Abbestam et al. |
| 4,925,013 A | 5/1990 | Lapeyre |
| 4,934,517 A | 6/1990 | Lapeyre |
| 4,949,838 A | 8/1990 | Lapeyre et al. |
| 4,972,942 A | 11/1990 | Faulkner |
| 4,989,723 A | 2/1991 | Bode et al. |
| 4,993,543 A | 2/1991 | Lapeyre |
| 4,993,544 A | 2/1991 | Bailey et al. |
| 5,020,656 A | 6/1991 | Faulkner |
| 5,031,757 A | 7/1991 | Draebel et al. |
| 5,065,860 A | 11/1991 | Faulkner |
| 5,069,330 A | 12/1991 | Palmaer et al. |
| 5,083,659 A | 1/1992 | Bode et al. |
| 5,105,938 A | 4/1992 | Tan |
| 5,131,526 A | 7/1992 | Kaak |
| 5,133,449 A | 7/1992 | Spangler |
| 5,139,135 A | 8/1992 | Irwin et al. |
| 5,156,262 A | 10/1992 | Horton |
| 5,156,264 A | 10/1992 | Lapeyre |
| 5,174,438 A | 12/1992 | Witham et al. |
| 5,174,439 A | 12/1992 | Spangler et al. |
| 5,181,601 A | 1/1993 | Palmaer et al. |
| 5,217,110 A | 6/1993 | Spangler et al. |
| 5,224,583 A | 7/1993 | Palmaer et al. |
| 5,253,749 A | 10/1993 | Ensch |
| 5,271,491 A | 12/1993 | Irwin |
| 5,280,833 A | 1/1994 | Robin |
| 5,303,818 A | 4/1994 | Gruettner et al. |
| 5,310,045 A | 5/1994 | Palmaer et al. |
| 5,310,046 A | 5/1994 | Palmaer et al. |
| 5,332,084 A | 7/1994 | Greve |
| 5,339,946 A | 8/1994 | Faulkner et al. |
| 5,346,059 A | 9/1994 | Irwin |
| 5,361,893 A | 11/1994 | Lapeyre et al. |
| 5,372,248 A | 12/1994 | Horton |
| 5,379,883 A | 1/1995 | Damkjaer |
| 5,413,211 A | 5/1995 | Faulkner |
| 5,419,428 A | 5/1995 | Palmaer et al. |
| 5,425,443 A | 6/1995 | van Zijderveld et al. |
| 5,431,275 A | 7/1995 | Faulkner |
| 5,439,099 A | 8/1995 | Bos et al. |
| 5,507,383 A | 4/1996 | Lapyere et al. |
| 5,547,071 A | 8/1996 | Palmaer et al. |
| 5,562,200 A | 10/1996 | Daringer |
| 5,566,817 A | 10/1996 | Meeker |
| 5,573,105 A | 11/1996 | Palmaer |
| 5,573,106 A | 11/1996 | Stebnicki |
| 5,598,916 A | 2/1997 | Horton et al. |
| 5,613,597 A | 3/1997 | Palmaer et al. |
| 5,628,393 A | 5/1997 | Steeber et al. |
| 5,634,550 A | 6/1997 | Ensch et al. |
| 5,645,160 A | 7/1997 | Palmaer et al. |
| 5,678,683 A | 10/1997 | Stebnicki et al. |
| 5,690,210 A | 11/1997 | Layne |
| 5,738,205 A | 4/1998 | Draebel |
| 5,775,480 A | 7/1998 | Lapeyre et al. |
| 5,816,390 A | 10/1998 | Stebnicki |
| 5,850,902 A | 12/1998 | Hicks et al. |
| 5,906,270 A | 5/1999 | Faulkner |
| 5,911,305 A | 6/1999 | Layne |
| 5,921,379 A | 7/1999 | Horton |
| 6,036,001 A | 3/2000 | Stebnicki et al. |
| 6,079,543 A | 6/2000 | Palmaer |
| 6,148,990 A | 11/2000 | Lapeyre et al. |
| 6,196,381 B1 | 3/2001 | Kato et al. |
| 6,213,292 B1 | 4/2001 | Takahashi et al. |
| 6,216,854 B1 | 4/2001 | Damkjaer et al. |
| 6,227,356 B1 | 5/2001 | Van Zijderveld et al. |
| 6,330,941 B1 * | 12/2001 | Guldenfels .................. 198/853 |
| 6,345,715 B2 | 2/2002 | Palmaer |
| 6,357,581 B1 | 3/2002 | Guldenfels |
| 6,364,095 B1 | 4/2002 | Layne et al. |
| 6,367,616 B1 | 4/2002 | Lapeyre et al. |
| 6,382,405 B1 | 5/2002 | Palmaer |
| 6,390,288 B1 | 5/2002 | Damkjaer |
| 6,471,048 B1 | 10/2002 | Thompson, Jr. et al. |
| 6,523,680 B2 * | 2/2003 | Guldenfels .................. 198/853 |

* cited by examiner

RADIUS CONVEYOR BELT

CROSS-REFERENCE TO RELATED APPLICATIONS

The present application is a continuation of U.S. patent application Ser. No. 10/282,068 filed Oct. 29, 2002, now abandoned, which is a continuation of U.S. patent application Ser. No. 09/874,589 filed Jun. 5, 2001, now U.S. Pat. No. 6,523,680, which is a continuation-in-part application claiming priority to U.S. patent application Ser. No. 09/579,090 filed May 25, 2000, now U.S. Pat. No. 6,330,941 and entitled "Radius Conveyor Belt", all of which are incorporated herein by reference.

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

In many industrial applications, conveyor belts are used to carry products along paths including curved segments. Belts capable of flexing sidewise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

The requirement of following a curved path causes problems not found in straight-running belts. As one example, radius belts, especially if tightly tensioned or running fast and lightly loaded, tend to rise out of the conveyor support around a turn. As another example, because belt pull is concentrated in the outer portion of the belt as it rounds a turn, outer link ends are more likely to fail unless otherwise strengthened or bolstered.

There are other problems with some common belt designs. For example, stresses can be molded into the plastic modules during the manufacturing process. Sharp, as opposed to curved, junctions between molded features on a belt module are more likely to form concentrated stress regions. When such modules make up a conveyor belt, operation of the belt increases the stress in those regions. In a radius belt, in which the pulling load is unevenly distributed across the width of the belt as it rounds a turn, the problem is exacerbated. One way to solve the problem is to add more material to the belt, but that makes the belt heavier, increases the production cost due to the larger molding cycle and closes in some of the desirable open area that allows for drainage or air flow.

Another problem with some structures of radius belts is compression of the modules transverse to the direction of belt travel. A radius belt bricklayed to a width of, for example one meter, may compress by three to four millimeters as the belt rounds a turn, which can cause the belt to come out of the conveyor support. Belts having the corrugated configuration shown in U.S. Pat. No. 5,372,248 to Horton are especially susceptible to bending and compression of this type.

What is needed is a modular radius conveyor belt that is resistant to compression and that improves the engagement of the belt to the drive sprocket.

BRIEF SUMMARY OF THE INVENTION

The present invention meets the above-described need by providing an endless conveyor belt formed of plastic belt modules and capable of following a curved path. The modules include first and second module surfaces, i.e., a top, product-conveying surface and a bottom, sprocket-driven surface. An intermediate section extends across the width of each module transverse to the direction of belt travel. The intermediate section is formed in part by a web and in part by a thin, corrugated strip having a pair of essentially parallel walls. The corrugated strip forms a series of regularly spaced alternating ridges and valleys along each wall. Link ends extend outward from the ridges on each wall of the corrugated strip. Each link end has a leg portion attached at a ridge of the strip and a thick distal portion at the end of the link end distant from the corrugated strip. Transverse holes in the link ends extending from respective walls of a module are aligned to accommodate a pivot rod. When the link ends of consecutive rows of side-by-side modules are intercalated, the pivot rod serves as a hinge pin in a hinged joint between consecutive interlinked rows. To permit the belt to follow a curved path, the pivot rod openings in at least one of the link ends extending from one of the walls of the corrugated strip are slotted longitudinally in the direction of belt travel.

The belt is driven by engagement of the sprocket tooth with the curved outside surface of the link ends. The link end engaged by the sprocket tooth is subjected to a compressive force rather than an undesirable tensile force. Thus, the link ends provide pull strength, resistance to belt and sprocket wear, and sprocket drivability. As an alternative, a central portion of a link end disposed in the middle belt modules may also engage with a tooth on the drive sprocket. Because the mid modules do not have to collapse fully, they may be formed with a thicker and fully straight cross-rib.

Each wall of the corrugated strip forms a series of arched recesses with the leg portions of the link ends. The recesses are large enough to provide room for a thick link end of an interlinked module of an adjacent row to collapse into the recess or to rotate as belt rows fan out going around a turn. Because the recesses along one wall overlap in a transverse direction with the recesses along the other wall, additional space for collapsing is provided.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Referring now to the drawings, FIGS. 1 to 7 show a first embodiment of a portion of a modular belt 20 of the present invention. The portion of the modular belt 20 shown is formed from molded plastic modules 23, 26 and 29. For reference, the direction of belt travel is indicated by arrow 32, however, the belt of the present invention may be conveyed in either direction. A pivot rod 35 connects adjacent belt modules by passing through openings in the modules disposed transverse to the direction of belt travel.

Figures 2, 3, 4:
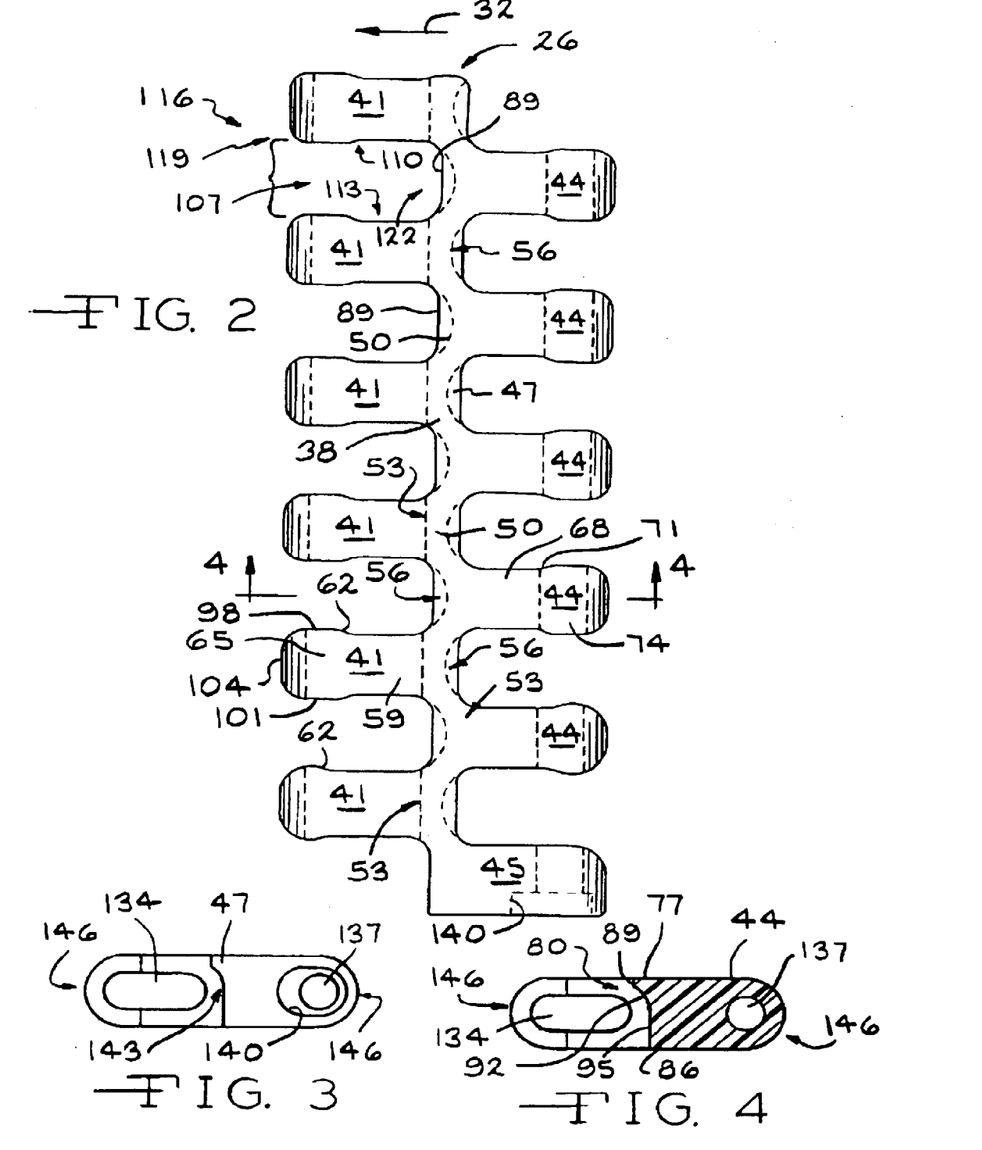
FIG. 2 is a top plan view of a belt module of the present invention.
FIG. 3 is an end elevation view of a belt module of the present invention.
FIG. 4 is a sectional view taken along lines 4—4 of FIG. 2.

As shown in FIG. 2, an exemplary one of the belt modules 26 has an intermediate section 38 supporting a plurality of first link ends 41 and a plurality of second link ends 44. The first link ends 41 are disposed in the direction of belt travel indicated by arrow 32 and the plurality of second link ends 44 extend opposite the first link ends 41. As will be described in detail hereinafter, the intermediate section 38 is comprised of an upper, transverse stiffening web 47 forming into a lower corrugated portion 50. The corrugated portion 50 forms a series of ridges 53 and valleys 56 in a sinusoidal manner. Along with the transverse web 47 of the intermediate section 38, the ridges 53 extending toward the left of FIG. 2 support the first link ends 41 while the ridges 53 extending toward the right in the drawing support the second link ends 44.

The first link ends 41 include a leg portion 59 connected to an intermediate section 62 and extending to a distal head portion 65. In a similar manner, the second link ends 44 include a leg portion 68 connected to the intermediate section 71 and extending to a distal head portion 74.

With respect to the orientation shown in FIGS. 2 to 4, the intermediate section 38 formed of the stiffening web 47 and the corrugated portion 50 is comprised of an upper surface 77 extending to and meeting with opposed left and right walls 80 and 83 which, in turn, meet with a lower surface 86 of the module. The left wall 80 is comprised of an upper wall 89, which is part of the stiffening web 47, and extends downwardly to a curved wall 92 which forms into a lower vertical wall 95. The curved wall 92 and the lower vertical wall 95 are part of the corrugated portion 50 of the intermediate section 38. The lower vertical wall 95 extends to the lower surface 86 of the module which, in turn, extends to and meets with the right vertical wall 83.

As shown in FIG. 2, the head portion 65 is preferably larger than the leg portion 59. Accordingly, the head portion 65 is connected to the leg portion 59 by the angled intermediate section 62. The head portion 65 is preferably formed with two substantially parallel sides 98 and 101 connected by an outer end 104. The corners between the sides 98, 101 and ends 104 are preferably radiused to be smooth and to protect the conveyed product from damage.

An opening 107 is defined between spaced apart sides 110, 113 of adjacent link ends. At a distal end 116, the ends of adjacent links form the mouth 119 of the opening 107. At the opposite end 122, the opening 107 terminates in the multi-level surface defined by the web 47 and corrugated portion 50 as described above. The top level of the surface (best shown in FIG. 1) is defined by wall 89 of the web 47. The corners where the side walls of the link ends 41 meet the straight wall 89 of web 47 are also radiused to be smooth and to protect the conveyed product from damage.

Figure 5:
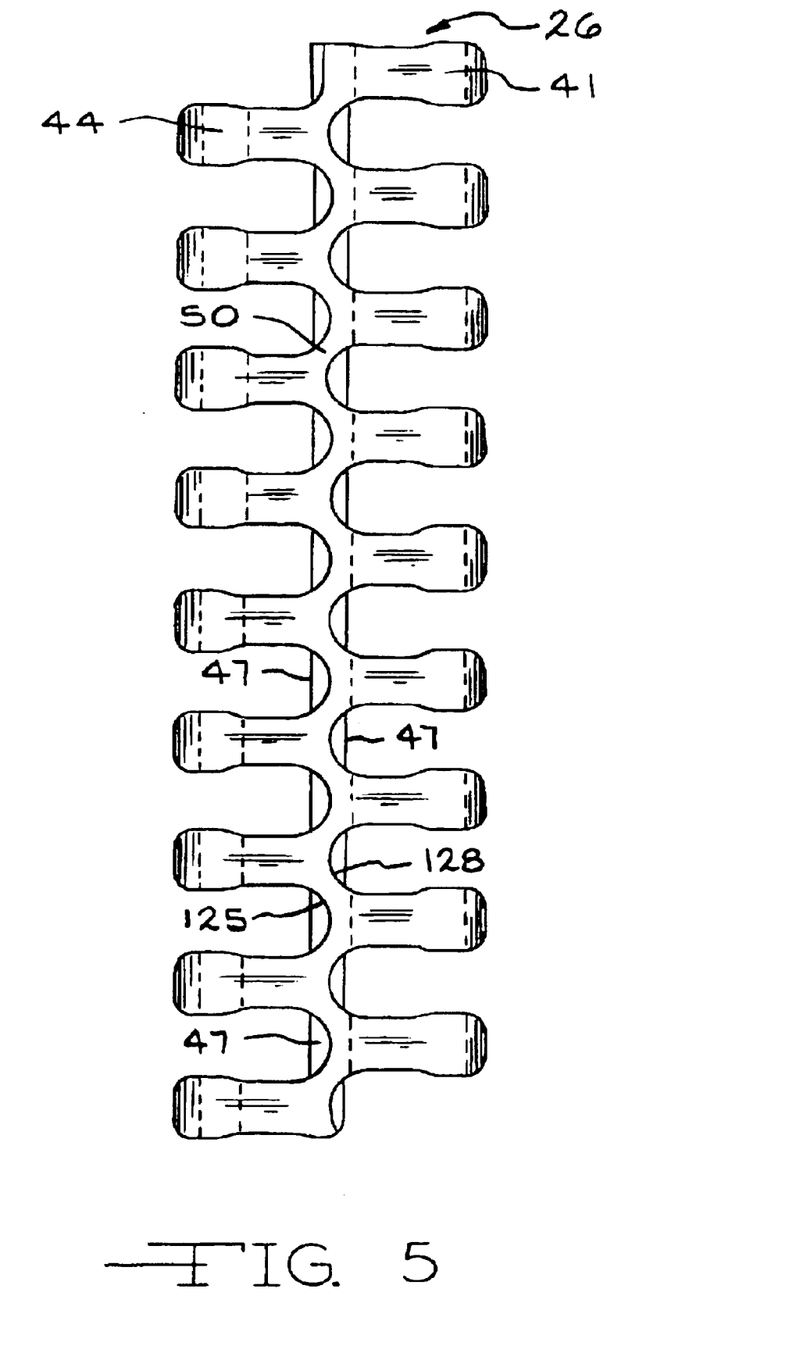
FIG. 5 is a bottom plan view of a belt module of the present invention.
Figure 6:
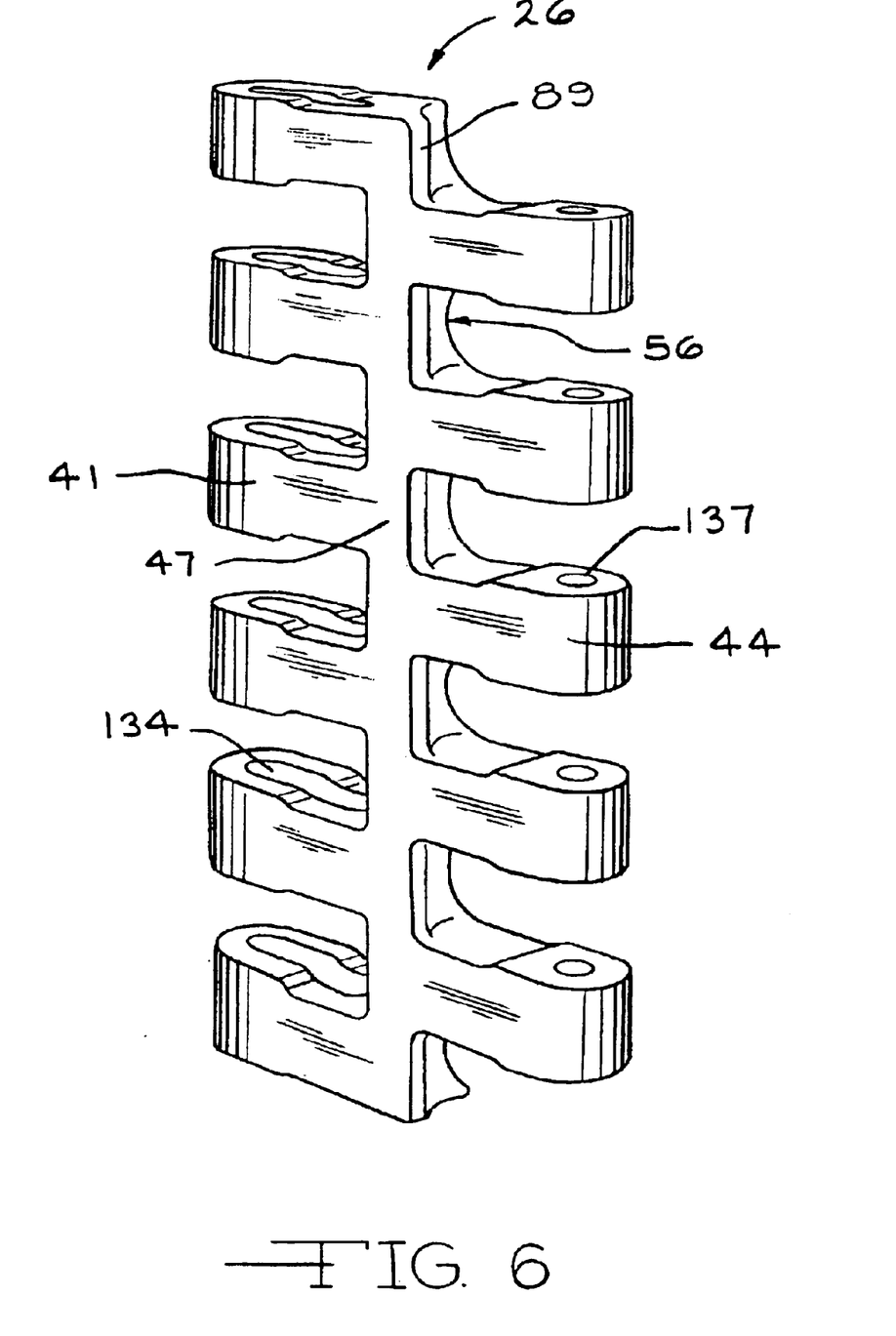
FIG. 6 is a top perspective view of the belt module of the present invention.
Figure 7:
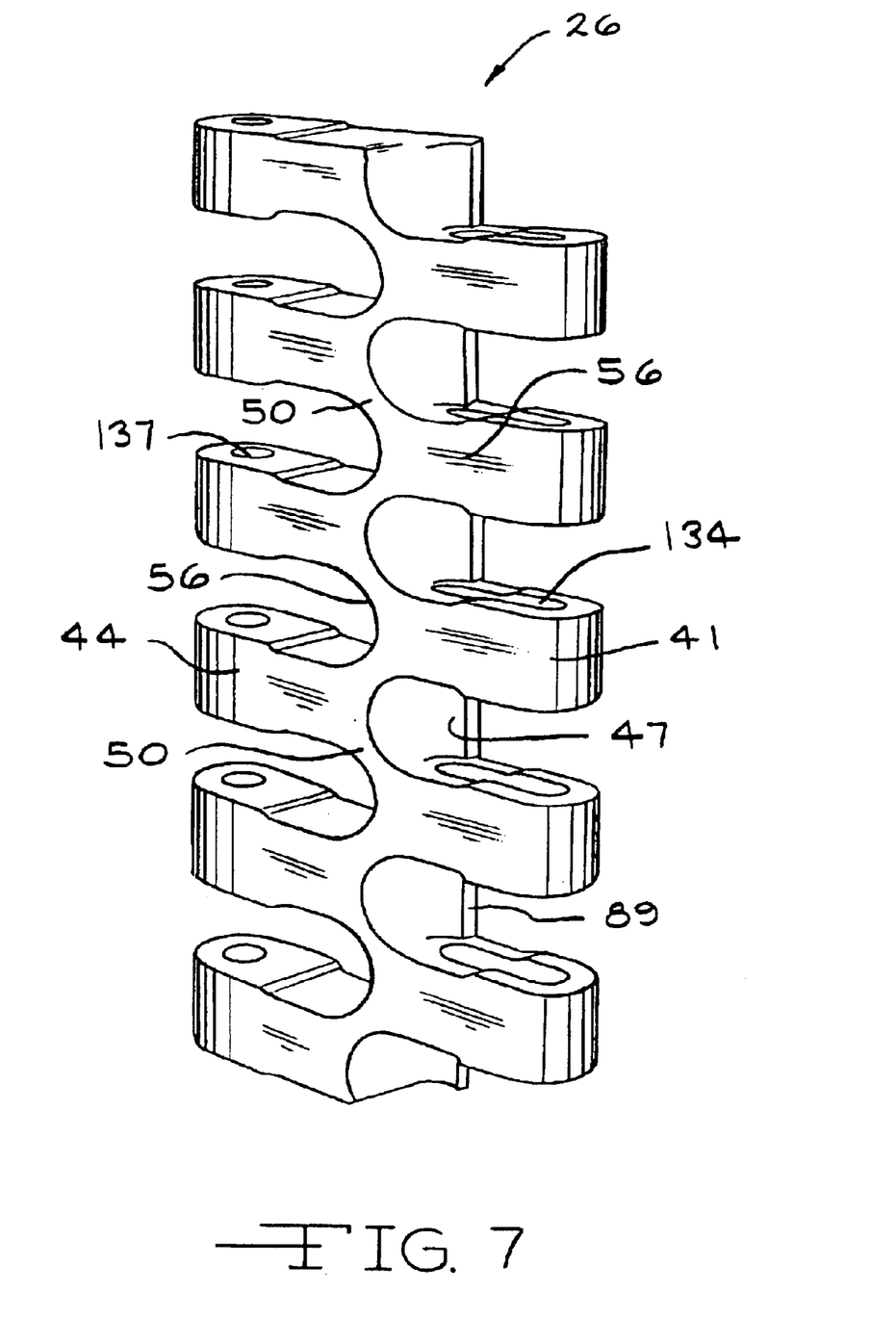
FIG. 7 is a bottom perspective view of the belt module of the present invention.

In FIG. 5, the bottom level of the surface is defined by the relatively thin corrugated portion 50 having a pair of essentially parallel walls 125, 128. The corrugated portion 50 forms the series of regularly spaced alternating ridges 53 and valleys 56 along the intermediate section 38, as described herein.

Returning to FIG. 2, the straight wall 89 is shown bordering the opening 107. The curved surface defined by corrugated portion 50 is shown in broken lines. The curved surface receives link ends from an adjacent belt module such that the belt 20 is capable of collapsing for movement around a curved path, as described in detail herein.

The plurality of second link ends 44 extend from the belt module 26 in the opposite direction from the first link ends 41. The second link ends 44 have the same overall shape as the first link ends 41 (except for the last link end 45) and are designed to fit into the openings between the first link ends 41 such that adjacent belt modules can be intercalated and pivotally connected by the pivot rods 35.

Figure 1:
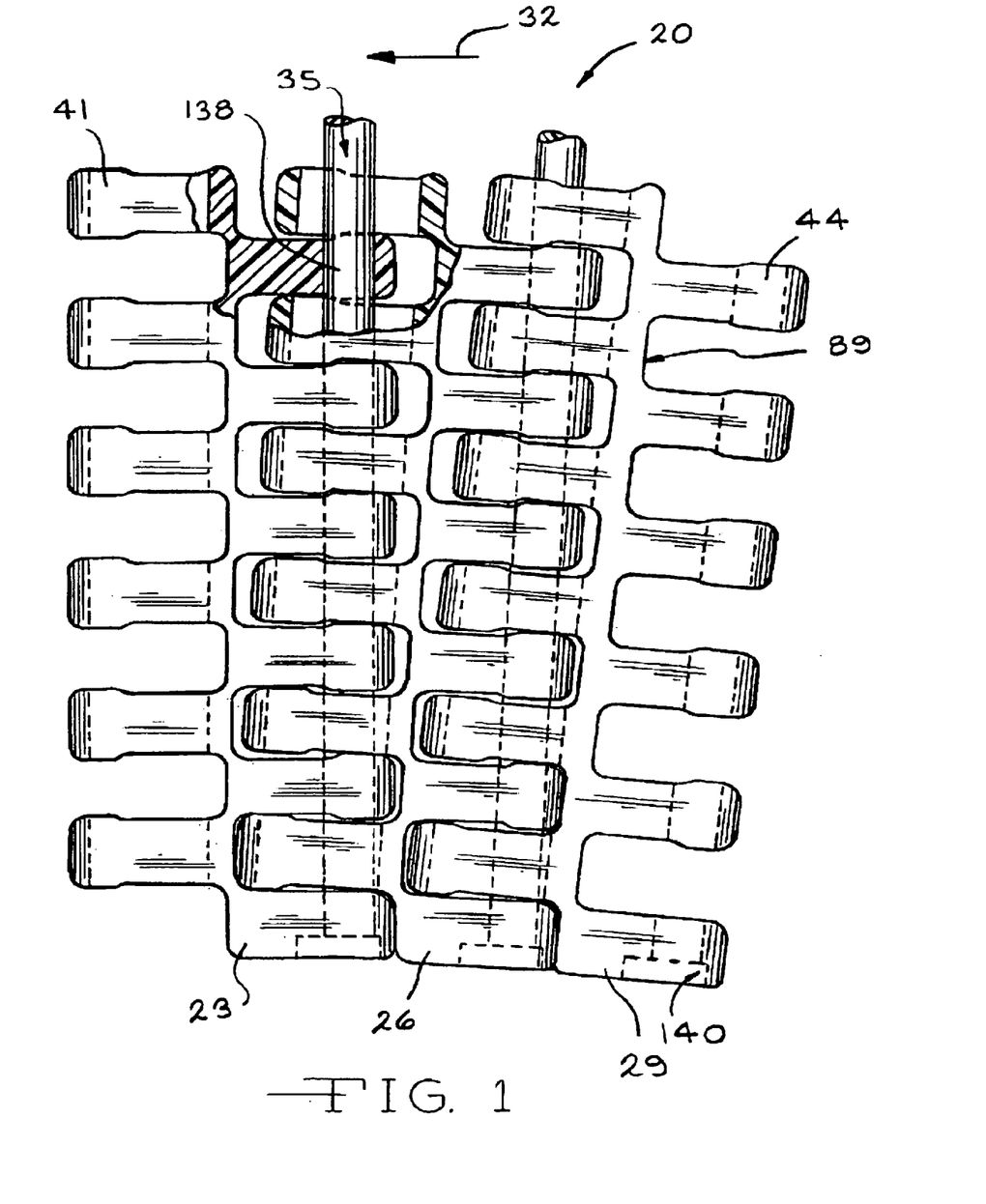
FIG. 1 is a top plan view of a radius conveyor belt of the present invention with a portion of one of the belt modules cutaway.

As shown in FIG. 3, the belt module 26 includes a slot 134 that is disposed through the link ends 41 transverse to the direction of belt travel. The slot 134 extends in the direction of belt travel such that it is generally oblong. The slot 134 receives the pivot rod 35. The pivot rod 35 passes through the slots 134 in the first link ends 41 and through the openings 137 in the second link ends 44 (as shown in FIG. 1). The openings 137 correspond to the shape of the shaft 138 (FIG. 1) of the pivot rod 35 such that the pivot rod 35 is received through the opening 137 but in contrast to slot 134, the pivot rod 35 preferably cannot move in the direction of belt travel inside opening 137. Due to the oblong shape of slot 134, the pivot rod 35 can pivot inside the slot 134 such that the belt 20 is capable of collapsing on one side while the other side fans out due to the pivoting of rod 35 and the nesting of the link ends 41, 44 and cooperating spaces in the adjacent belt modules.

The last link end 45 of the belt module 26 includes a second opening 140 disposed around opening 137 to provide for countersinking a head (not shown) at the end of the pivot rod shaft 138.

The back surface of the last link end 45 includes a rounded surface 143 that provides clearance for pivoting an adjacent link end 45.

In FIG. 4, the transverse slot 134 in link ends 41 and the transverse opening 137 in link ends 44 receive pivot rods 35 to connect adjacent belt modules 23 and 29 as shown in FIG. 1. The web 47 is coterminous with the top surface 77 of the belt module 26 and terminates at the top of the corrugated portion 50 that defines the space between adjacent link ends (best shown in FIG. 5).

The outer ends 104 of the link ends 41 and 44 are radiused in a smooth rounded surface 146. The rounded surface 146 preferably comprises a rounded surface having a constant radius and provides a driving surface for engagement with the drive sprocket 149, as described herein.

Also, the curvature of the outer ends 104 of the link ends enables the links to clear the web 47 when the adjacent modules collapse along the edge. The clearance enables the link ends to extend under the web 47 into the space defined by the corrugated portion 50 (best shown in FIGS. 6–7). In this manner, the web 47 partially hoods the link ends when the belt 20 collapses. Accordingly, the belt module 26 provides a web 47 for structural stability while maintaining a corrugated portion 50 to allow for recesses that provide maximum space for collapsing the belt modules around a curved path.

Turning to FIGS. 8–11, an alternate embodiment comprising belt module 200 is shown. Belt module 200 is suitable for center modules in a bricklayed belt.

Figure 8:
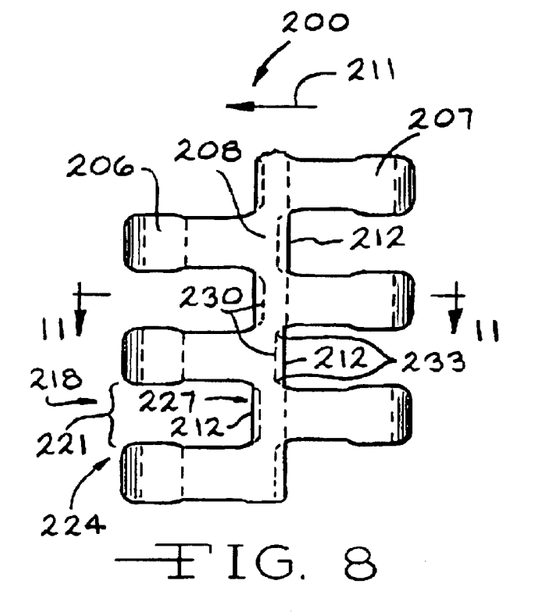
FIG. 8 is a top plan view of an alternate embodiment of a belt module suitable for use in the middle of a bricklayed modular radius conveyor belt according to the present invention.

The belt module 200 includes link ends 206, 207 which are supported by an intermediate section 208. The link ends 206 have a slot 209 disposed transverse to the direction of belt travel indicated by arrow 211. Link ends 207 have a transverse opening 213 that corresponds to the shaft 138 of pivot rod 35.

Figure 9:
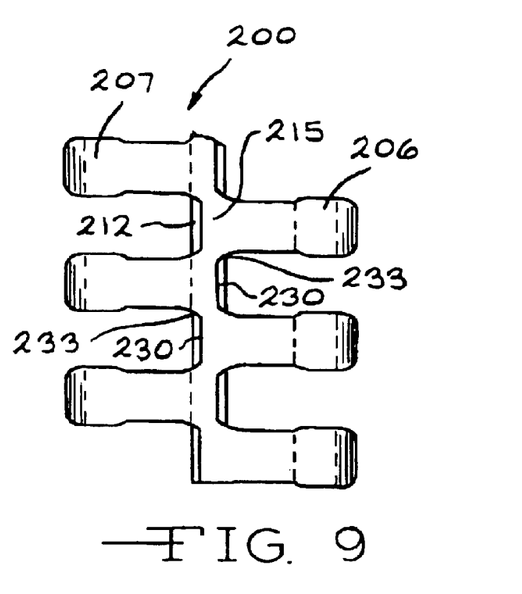
FIG. 9 is a bottom plan view of the belt module of FIG. 8.

As shown in FIG. 9, the belt module 200 has a web 212 that is part of the intermediate section 208 and that is wider than the corrugated portion 50 of the edge module 26 shown in FIGS. 1–7 (best shown in FIG. 5). In FIG. 8, the opening 218 between the link ends 206 is defined by a mouth 221 at one end 224 and is defined at the opposite end 227 by a multilevel surface defined by the web 212 and by a straight wall portion 230 that joins with the link end in a curved section 233.

Figure 10:
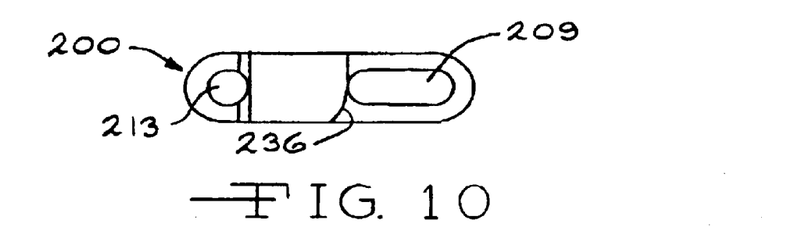
FIG. 10 is an end elevational view of the belt module of FIG. 8.
Figure 11:
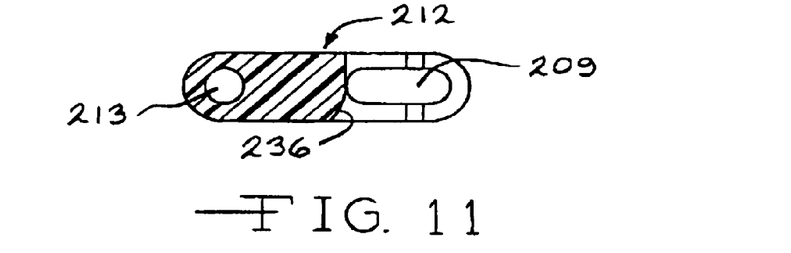
FIG. 11 is a section view taken along lines 11—11 of FIG. 8.
Figure 14:
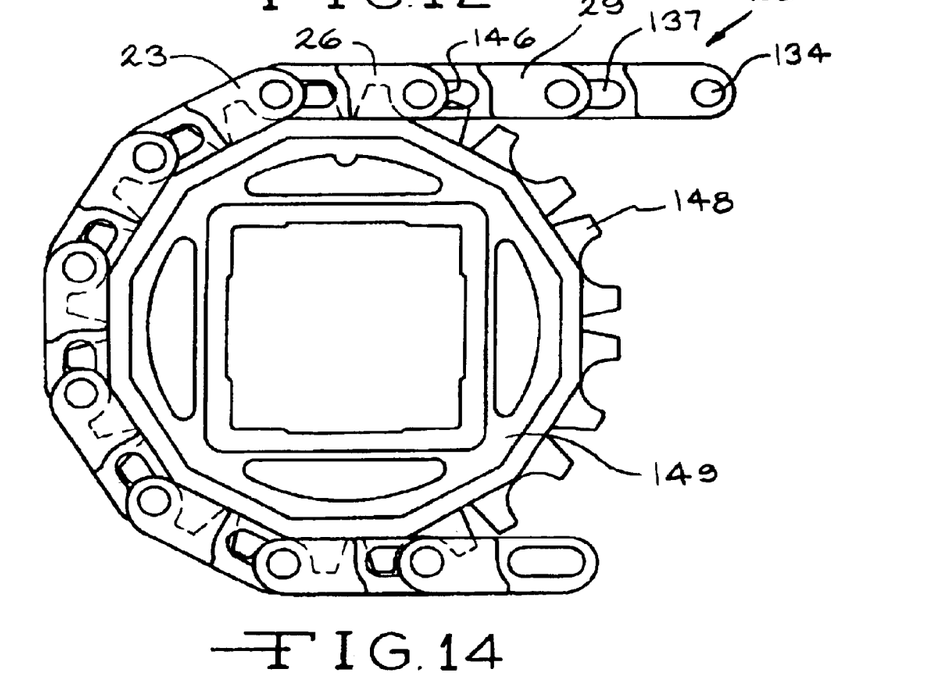
FIG. 14 is a side elevation view of a drive sprocket engaging the radius conveyor belt of the present invention; and, FIG. 15 is a cutaway side elevation view of a drive sprocket engaging with the link end and center cross-rib of the mid modules of the present invention.

As shown in FIGS. 10 and 11, the bottom of the intermediate section 208 of the link ends is angled to provide a face 236 for engagement of the intermediate section 208 with the teeth 148 on the drive sprocket 149 (FIG. 14). The drive sprocket 149 is described in detail hereafter.

The link ends 207 have the transverse opening 213 capable of receiving the pivot rod 35. Link ends 206 have the transverse slot 209 that is oblong and extends in the direction of belt travel such that the pivot rod 35 can move inside the slot 209 to pivot and facilitate collapsing.

The engagement of the face 236 on the central portion 215 with the tooth 148 on the drive sprocket 149 (shown in FIG. 15) assists in maintaining engagement between the belt 20 and the drive sprocket 149 and assists in driving the belt 20. The primary drive mechanism is described in detail below.

Figure 12:
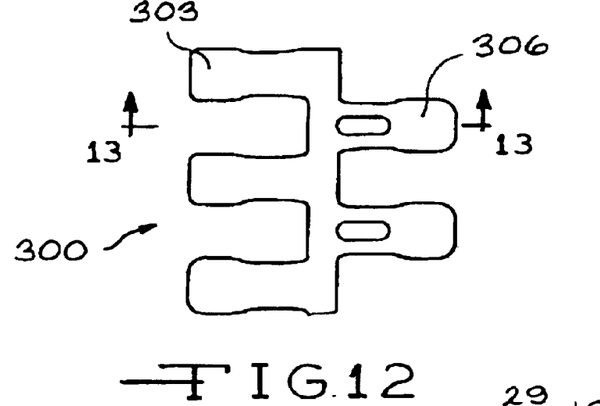
FIG. 12 is a top plan view of an alternate embodiment of the belt module of the present invention.
Figure 13:
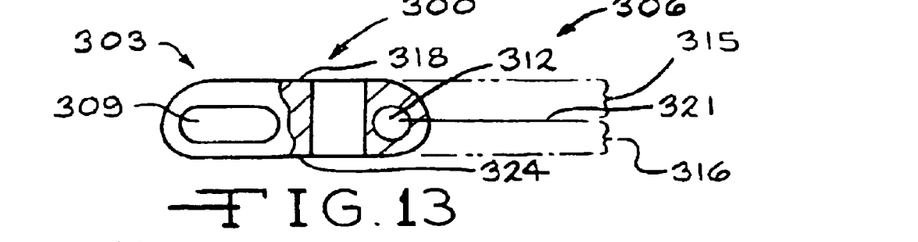
FIG. 13 is a sectional view taken along lines 13—13 of FIG. 12.

Turning to FIGS. 12–13, belt module 300 is an alternate embodiment of belt modules 23, 26, 29 of FIGS. 1–7. Belt module 300 differs from the previous modules because the slot and the holes are positioned off center on the link ends 303 and 306, respectively. The transverse slot 309 and transverse openings 312 are located lower on the belt module 300 which provides for increased module strength. The distance 315 from the top surface 318 to the center 321 of the opening 312 is greater than the distance 316 from the center 321 of the opening 312 to the bottom surface 324. Also, the link end 303 with the transverse slot 309 is designed such that the radius of curvature at the rounded end is greater above the slot 309 than it is below the slot 309.

As an option, the belt module 300 includes a plurality of openings 331 that provide for reducing the weight and material cost for the belt and provide open areas for cleaning the belt. The vertical openings 331 in the link ends 306 are shown in FIGS. 12 and 13.

Figure 15:
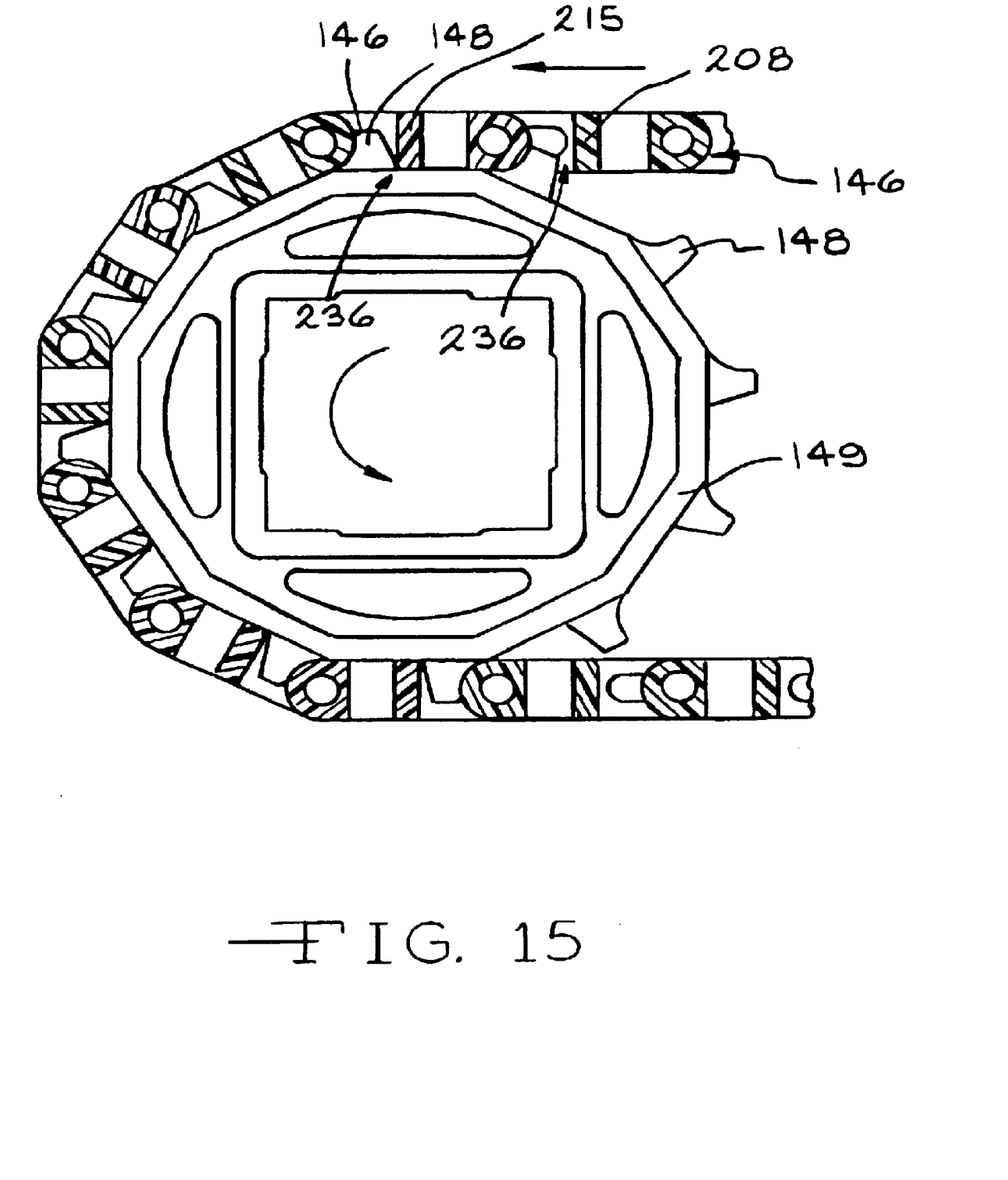

Turning to FIGS. 14 and 15, the belt modules 20 (FIGS. 1–7) are shown driven by the teeth 148 on the drive sprocket 149. The drive sprocket 149 is center driven by a rotating shaft (not shown) as known to those of ordinary skill in the art. The teeth 148 engage with the rounded surface 146 on the outside of the link ends and push the link ends forward. In addition to the engagement of the teeth on the rounded surface 146 of the link ends, the central portions 215 (FIG. 15) of the middle modules push against the teeth along the angled face 236.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, which comprises:
    a) an intermediate section having opposed first and second walls, wherein the intermediate section has an intermediate width defined by the first and second walls and a thickness defined by an upper surface and a lower surface and wherein the intermediate section comprises a web portion extending across the intermediate width between the first and second walls and from one of the upper and lower surfaces to a portion of the way through the thickness of the intermediate section to form into a corrugated portion extending across the intermediate width between the first and second walls to the other of the upper and lower surfaces, wherein the corrugated portion forms a series of regularly spaced ridges and valleys in a sinusoidal manner extending substantially across a lateral width of the module;
    b) a first plurality of link ends extending outwardly from the intermediate section including the web portion and being connected to the regularly spaced ridges of the first wall of the corrugated portion;
    c) a second plurality of link ends extending outwardly from the intermediate section including the web portion and being connected to the regularly spaced ridges of the second wall of the corrugated portion and in a direction opposite the first link ends; and
    d) transverse openings provided in each of the first and second link ends.

2. The belt module of claim 1, wherein the first and second link ends each have a leg portion connected to the intermediate section including the respective regularly spaced ridges, and wherein each leg portion has substantially parallel leg sidewalls.

3. The belt module of claim 2, wherein the first and second link ends each have a head portion that is wider than the leg portion, the head portion having a pair of substantially parallel head sidewalls and an endwall.

4. The belt module of claim 1 wherein at least the opening in one of the first and second plurality of link ends is elongated in a direction along an axis of the link end extending from the intermediate section.

5. The belt module of claim 1 wherein a first longitudinal axis of the transverse openings in the first link ends and a second longitudinal axis of the transverse openings in the second link ends are positioned substantially equidistant from the upper and lower surface of the intermediate section.

6. The belt module of claim 1 wherein a first longitudinal axis of the transverse openings in the first link ends and a second longitudinal axis of the transverse openings in the second link ends are spaced closer to the lower surface of the intermediate section than to the upper surface thereof.

7. A radius conveyor belt, comprising:
a) a plurality of belt modules, each having a plurality of first link ends disposed in the direction of belt travel, a plurality of second link ends disposed in the opposite direction, and an intermediate section disposed between and connected to the first and second plurality of link ends, wherein at least some of the modules are provided with the intermediate section having a width defined by the first and second walls and a thickness defined by an upper surface and a lower surface and wherein the intermediate section comprises a web portion extending across the intermediate width between the first and second walls and from one of the upper and lower surfaces to a portion of the way through the thickness of the intermediate section to form into a corrugated portion extending across the intermediate width between the first and second walls to the other of the upper and lower surfaces, wherein the corrugated portion forms a series of regularly spaced ridges and valleys in a sinusoidal manner extending substantially across a lateral width of the module;
b) a first plurality of link ends extending outwardly from the intermediate section including the web portion and being connected to the regularly spaced ridges of the first wall of the corrugated portion;
c) a second plurality of link ends extending outwardly from the intermediate section including the web portion and being connected to the regularly spaced ridges of the second wall of the corrugated portion and in a direction opposite the first link ends, the plurality of first and second link ends being disposed such that a space capable of receiving a link end is formed between each adjacent link end, the space being open at one end and terminating in a rounded region at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module, wherein the plurality of first link ends each have a transverse slotted opening disposed transverse to the direction of belt travel and extending in the direction of belt travel, the plurality of second link ends having a transverse opening defined therein; and
d) a pivot rod extending transverse to the direction of belt travel through the openings in the second link ends of one of the plurality of belt modules and extending through the slotted openings in the first link ends of an adjacent belt module such that the first and second link ends of the adjacent belt modules are intercalated and the adjacent belt modules are interlinked into adjacent hinged rows capable of following a curved path.

8. The radius conveyor belt of claim 7, wherein the first and second link ends each have a leg portion connected to the intermediate section including the respective regularly spaced ridges, and wherein each leg portion has substantially parallel leg sidewalls.

9. The radius conveyor belt of claim 8, wherein the first and second link ends each have a head portion that is wider than the leg portion, the head portion having a pair of substantially parallel head sidewalls and an endwall.

10. The radius conveyor belt of claim 7 wherein the web portion of a first module is capable of hooding the link ends of a second module intercalated with the first module.

11. A conveying system, comprising:
a) an endless radius conveyor belt, comprising a plurality of belt modules, each having a plurality of first link ends disposed in the direction of belt travel and provided with a first rounded endwall, a plurality of second link ends disposed in the opposite direction and provided with a second rounded endwall, and an intermediate section disposed between and connected to the first and second plurality of link ends, wherein at least some of the modules are provided with the intermediate section having an intermediate width defined by the first and second walls and a thickness defined by an upper surface and a lower surface, and wherein the intermediate section comprises a web portion extending across the intermediate width from the first wall to the second wall and from one of the upper and lower surfaces to a portion of the way through the thickness of the intermediate section to form into a corrugated portion extending across the intermediate width from the first wall to the second wall to the other of the upper and lower surfaces, wherein the corrugated portion forms a series of regularly spaced ridges and valleys in a sinusoidal manner extending substantially across a lateral width of the module;
b) a first plurality of link ends extending outwardly from the intermediate section including the web portion and being connected to the regularly spaced ridges of the first wall of the corrugated portion;
c) a second plurality of link ends extending outwardly from the intermediate section including the web portion and being connected to the regularly spaced ridges of the second wall of the corrugated portion and in a direction opposite the first link ends, the first and second link ends disposed such that a space capable of receiving a link end is formed between each adjacent link end, the space being open at one end and terminating in a rounded region at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module, wherein the plurality of first link ends each have a transverse slotted opening disposed transverse to the direction of belt travel and extending in the direction of belt travel, and wherein the plurality of second link ends have a transverse opening defined therein;

d) a pivot rod extending transverse to the direction of belt travel through the openings in the second link ends of one of the plurality of belt modules and extending through the slotted openings in the first link ends of an adjacent belt module such that the first and second link ends of the adjacent belt modules are intercalated and the adjacent belt modules are interlinked into adjacent hinged rows capable of following a curved path;

e) at least one middle belt module disposed in an interior position of the conveyor belt and comprising the intermediate section having an angled face; and f) a drive sprocket having teeth disposed around the perimeter thereof, the teeth capable of engaging with the first and second rounded endwalls of the link ends and capable of engaging with the angled face on the intermediate section of the middle belt module to drive the endless conveyor belt around a conveying path.

12. The conveying system of claim 11, wherein the first and second link ends each have a leg portion connected to the intermediate section including the respective regularly spaced ridges, and wherein each leg portion has substantially parallel leg sidewalls.

13. The conveying system of claim 12, wherein the first and second link ends each have a head portion that is wider than the leg portion, the head portion having a pair of substantially parallel head sidewalls and an endwall.

14. A belt module, which comprises:

a) an intermediate section having opposed first and second walls, wherein the intermediate section has an intermediate width defined by the first and second walls and a thickness defined by an upper surface and a lower surface and wherein the intermediate section comprises a web portion extending across the intermediate width from the first wall to the second wall and from one of the upper and lower surfaces to a portion of the way through the thickness of the intermediate section to form into a corrugated portion extending across the intermediate width from the first wall to the second wall to the other of the upper and lower surfaces, wherein the corrugated portion forms a series of regularly spaced ridges and valleys in a sinusoidal manner extending substantially across a lateral width of the module;

b) a first plurality of link ends extending outwardly from at least the regularly spaced ridges of the first wall of the corrugated portion;

c) a second plurality of link ends extending outwardly from at least the regularly spaced ridges of the second wall of the corrugated portion and in a direction opposite the first link ends; and d) transverse openings provided in each of the first and second link ends.

* * * * *